(12) United States Patent
Ambrosy et al.

(10) Patent No.: US 8,517,673 B2
(45) Date of Patent: Aug. 27, 2013

(54) LAMELLAR SEAL FOR A TURBOMACHINE

(75) Inventors: Günter Ambrosy, Baden-Dättwil (CH);
Matthias Höbel, Windisch (CH); Ernst Vogt, Remigen (CH); Josef Hafner, Künten (CH)

(73) Assignee: ALSTOM Technology Ltd., Baden (CH)

( * ) Notice: Subject to any disclaimer, the term of this patent is extended or adjusted under 35 U.S.C. 154(b) by 746 days.

(21) Appl. No.: 12/732,359

(22) Filed: Mar. 26, 2010

(65) Prior Publication Data
US 2010/0247309 A1 Sep. 30, 2010

(30) Foreign Application Priority Data
Mar. 31, 2009 (DE) .......... 10 2009 015 122

(51) Int. Cl.
*F01D 25/00* (2006.01)
(52) U.S. Cl.
USPC ......... 415/174.2; 415/229; 415/230; 415/231
(58) Field of Classification Search
USPC .............................. 415/174.2, 229, 230, 231
See application file for complete search history.

(56) References Cited

U.S. PATENT DOCUMENTS

| | | | |
|---|---|---|---|
| 6,120,622 A | 9/2000 | Mayr et al. | |
| 6,267,381 B1 | 7/2001 | Wright | |
| 6,343,792 B1 * | 2/2002 | Shinohara et al. | 277/355 |
| 6,553,639 B2 | 4/2003 | Hobbs et al. | |
| 6,860,484 B2 | 3/2005 | Urlichs | |
| 6,874,788 B2 * | 4/2005 | Kono | 277/355 |
| 6,935,631 B2 | 8/2005 | Inoue | |
| 6,976,680 B2 * | 12/2005 | Uehara et al. | 277/355 |
| 7,047,638 B2 | 5/2006 | Eldridge et al. | |
| 7,201,378 B2 * | 4/2007 | Kono | 277/355 |
| 7,226,053 B2 * | 6/2007 | Nakano et al. | 277/355 |
| 7,261,515 B2 * | 8/2007 | Nishimoto et al. | 415/174.2 |
| 7,364,165 B2 * | 4/2008 | Nakano et al. | 277/355 |
| 7,487,588 B2 | 2/2009 | Hogg | |
| 2004/0232621 A1 | 11/2004 | Kono | |

(Continued)

FOREIGN PATENT DOCUMENTS

DE 19641375 12/1997
DE 19745184 4/1999

(Continued)

OTHER PUBLICATIONS

Search Report for German Patent App. No. 10 2009 015 122.2 (Dec. 1, 2009).

*Primary Examiner* — Igor Kershteyn
(74) *Attorney, Agent, or Firm* — Cermak Nakajima LLP; Adam J. Cermak

(57) ABSTRACT

A lamellar seal for sealing a shaft which rotates around an axis, especially in a gas turbine, includes a multiplicity of lamella (13) which are spaced one beneath the other, arranged in a concentric circle around the axis, and fixed in their position, wherein the lamellae (13) by their surfaces are oriented essentially parallel to the axis. The lamellar seal is improved by the fact that the lamellae (13) have formed-on structures (19, 20, 21) in each case for positioning and retaining the lamellae (13) in the lamellar seal (12), which include one or more laterally projecting support arms (19, 20, 21) which engage in complementarily formed recesses (25, 26) of the end plates (15, 16).

15 Claims, 7 Drawing Sheets

(56) References Cited

U.S. PATENT DOCUMENTS

| | | |
|---|---|---|
| 2007/0085277 A1 | 4/2007 | Rhodes et al. |
| 2007/0102886 A1 | 5/2007 | Uehara et al. |
| 2007/0119909 A1 | 5/2007 | Rhodes |
| 2008/0007008 A1* | 1/2008 | Hoebel et al. ............... 277/355 |
| 2008/0061513 A1* | 3/2008 | Awtar et al. ................. 277/355 |

FOREIGN PATENT DOCUMENTS

| | | |
|---|---|---|
| DE | 10006298 | 8/2001 |
| DE | 102004020378 | 11/2005 |
| EP | 0933567 | 8/1999 |
| EP | 1013975 | 6/2000 |
| EP | 1302708 | 4/2003 |
| EP | 1365181 | 11/2003 |
| EP | 1479953 | 11/2004 |
| EP | 1489340 | 12/2004 |
| EP | 1626210 | 2/2006 |
| EP | 1785648 | 5/2007 |
| FR | 2650048 | 1/1991 |
| GB | 2021210 | 11/1979 |
| WO | WO03/072287 | 9/2003 |
| WO | WO2005/095829 | 10/2005 |
| WO | WO2005/103534 | 11/2005 |
| WO | WO2005/103535 | 11/2005 |
| WO | WO2005/103536 | 11/2005 |
| WO | WO2006/061324 | 6/2006 |

* cited by examiner

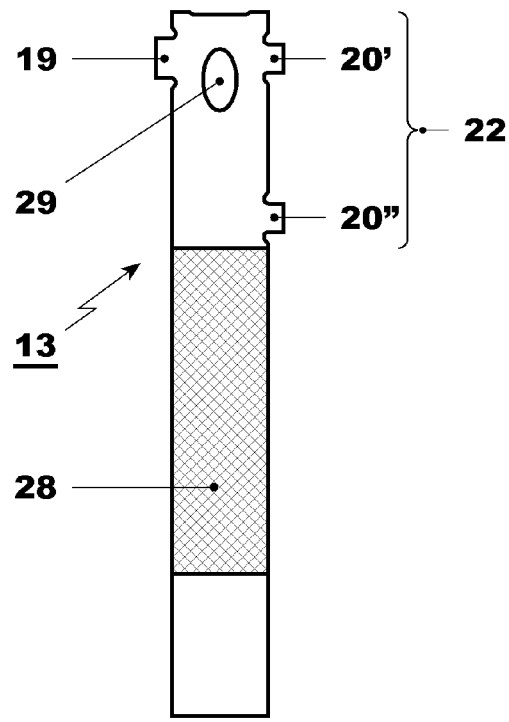
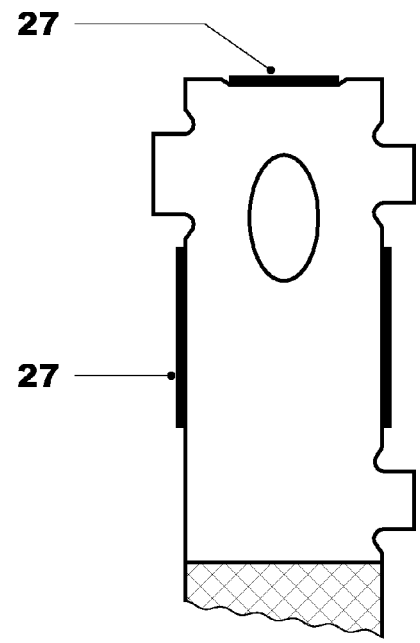
FIG. 3a
FIG. 3b
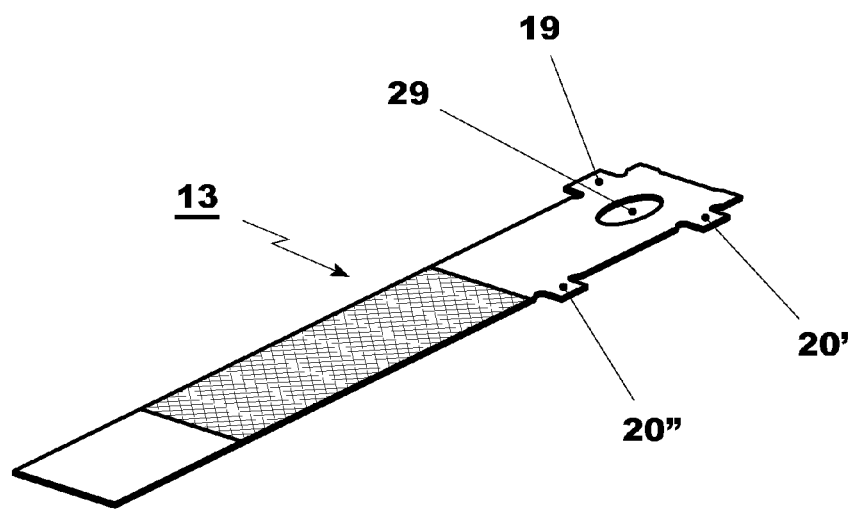
FIG. 3c

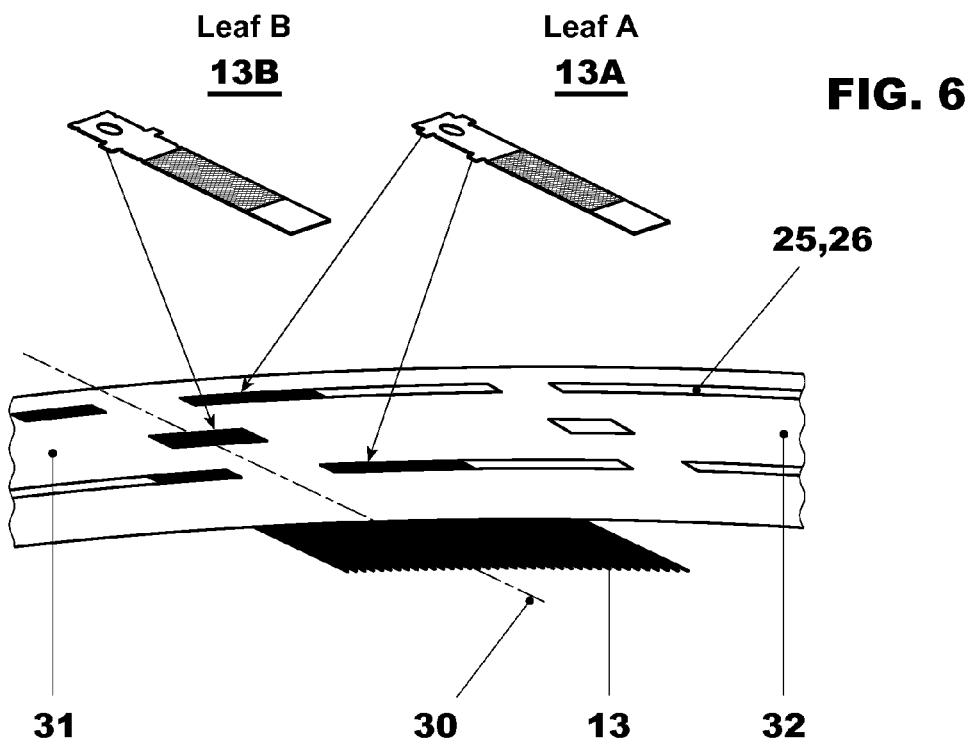
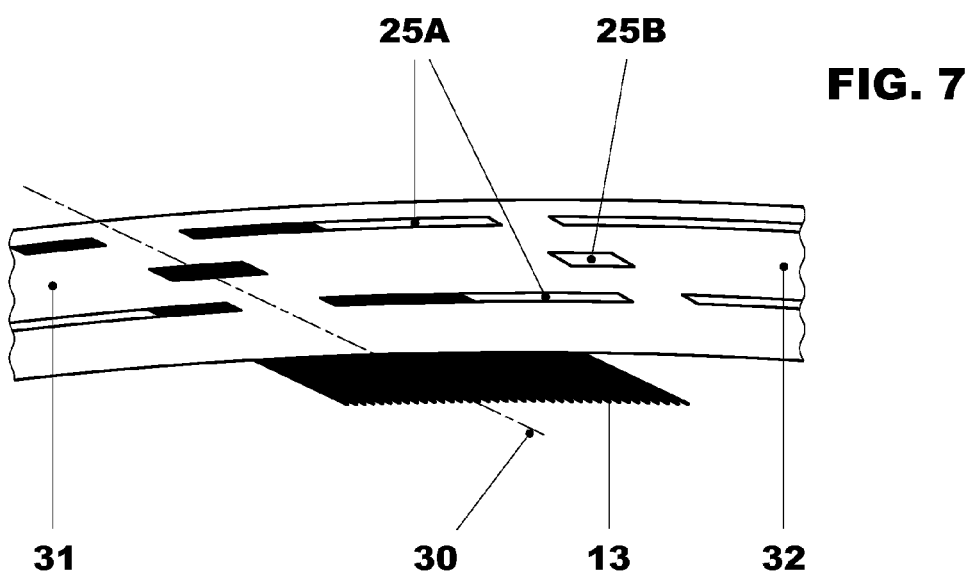

LAMELLAR SEAL FOR A TURBOMACHINE

This application claims priority under 35 U.S.C. §119 to German Application No. 102009015122.2, filed 31 Mar. 2009, the entirety of which is incorporated by reference herein.

BACKGROUND

1. Field of Endeavor

The present invention relates to the field of turbomachines, especially to those turbomachines with large rotor diameters, such as stationary gas turbines or steam turbines, but also to jet engines. The present invention also relates to a lamellar seal around the rotating shaft of such a machine.

2. Brief Description of the Related Art

A gas turbine includes a rotor, upon which different stages with compressor blades and turbine blades are attached, and also a stator casing. The rotor is mounted at each end of the rotor shaft in bearings.

Controlling the gas flow inside the gas turbine is of paramount importance with regard to both the functionality and the efficiency of the gas turbine. Of outstanding importance in this context is the prevention of leakage flows of the operating fluid. Therefore, seals are arranged at different points along the rotor shaft in order to at least reduce an axial leakage flow of the operating fluid along the shaft. A seal close to the bearings is of particular importance in order to prevent the lubricant of the bearing being overheated as a result of the hot fluid flow.

Differentiation can be made between three technologies of customary seals: labyrinth seals, brush seals, and lamellar seals.

Labyrinth seals do not have any, or hardly any, metal-metal contact between the rotor and the stator; therefore their sealing effect is comparatively slight. However, they offer the advantage of low rotational friction and therefore offer a long service life.

Brush seals, on the other hand, have higher friction losses on account of the rubbing between the bristle ends and the rotor shaft. This results in wear which limits the service life of the seal. The brush seals, however, offer a better blocking of the axial gas flow, particularly in the case of higher axial pressure differences.

Lamellar seals, compared with the two other technologies, have the potential for significantly improving the sealing capacity. Instead of the multiplicity of thin brush wires which are used in the case of brush seals, lamellar seals use a multiplicity of thin metal lamellae in order to seal the gap between stationary and rotating turbine components. In this case, similarly small leakages are achieved as in the case of brush seals. As a result of the modified geometry of the flexible seal elements and their increased rigidity in the axial direction, lamellar seals, however, can be used in the case of significantly higher pressure differences. This allows seals with more compact dimensions to be constructed compared with the other technologies. Moreover, a suitable design of lamellae brings about the forming of advantageous hydrodynamic effects ("blow-up" effect) which is reflected in a reduced wear behavior and consequently leads to a longer service life in an order of magnitude which cannot be achieved with brush seals.

The basic design of a lamellar seal is known from EP 933567. Instead of the bristles consisting of wires with circular cross section, thin metal lamellae or metal leaves were arranged in a controlled spacing one beneath the other and at a defined angle to the radius. The lamellae, which are oriented by their surfaces essentially parallel to the axial direction, are much stiffer in the axial direction than in the circumferential direction. Therefore, the seal can withstand higher pressure differences without its capabilities for permitting radial movements being restricted in the process. Also, the wide region on the rotor, which is brushed over by the points of the lamellae, presents the opportunity of creating a hydrodynamic force during operation which can separate the lamellae points from the shaft. In this way, a minimum distance can be created and maintained so that wear, friction heat, and friction losses are kept very low.

The gap between the lamellae is a critical design parameter: it enables the occurrence of a fluid flow in order to consequently create the hydrodynamic effect; however, it should not be so large as to allow an excessive axial leakage flow.

According to the invention which is represented in WO 2006/061324, the lamellae have spacer elements for establishing the distance between successive lamellae of the lamellar seal, and the devices for positioning and retaining the lamellae include one or more laterally protruding projections on the lamellae in the region of the spacer elements. In particular, the handling of the lamellae and their assembly to form lamellae packets is further improved by the projections being asymmetrically formed with regard to a center line of the lamellae which extends in the longitudinal direction. The asymmetry can be achieved by a projection being provided only on one side. It is also conceivable, however, for provision to be made for two oppositely-disposed projections which laterally project by different distances. Furthermore, an asymmetry can be brought about by provision being made for two oppositely-disposed projections which are located at different heights, as seen in the longitudinal direction. For establishing a distance between successive lamellae in the lamellar seal, spacer elements are preferably provided; the projections in this case are arranged in the region of the spacer elements. The spacer elements can be formed as integral elements on the lamellae as regions of greater thickness, or can be formed as separate elements.

Depending upon the selected geometry for the seal and upon the diameter of the shaft which is to be sealed, the number of lamellae per seal can go into the thousands. It is inevitable that the accuracy with which these can be produced, assembled and connected follows from this, wherein a reproducible gap between each pair of lamellae is to be ensured, which is a critical factor for the successful implementation of each possible seal design. One of the basic problems during the production of a lamellar seal is simply the difficulty in assembling this multiplicity of lamellae in a predetermined configuration with the necessary low tolerances. Critical elements are above all the dimensional stability of the angle w1 (see FIG. 2) between rotor surface and lamellae axis and the narrow gap between the lamellae.

Just as critical is the joining step in which thousands of such lamellae are connected in a fixed manner to a support structure. WO 2005/095829 proposes in this context the use of an innovative soldering process for the production of lamellar seals. By the use of special soldering foil, a supersolidus soldering is realized, during which the soldering foil remains largely in a solid state and therefore no solder penetrates into the spaces, which are to be kept free, between the lamellae.

The installation problem represents a further problem for the implementation of such a seal in such a way that a lamellar sealing ring, which is constructed in one piece, cannot be slid over the shaft end to its intended position. Therefore, a lamellar seal has to be constructed in at least two pieces in order to be joined together at the place of installation to form a homogeneous sealing ring without the basic structure and the operating principle of the seal being negatively impaired or even interrupted. Up to now, this problem has still not been satisfactorily solved.

SUMMARY

One of numerous aspects of the present invention involves largely avoiding the aforesaid disadvantages of a lamellar seal and a geometry of the seal lamellae which allows individual modules or complete seals to be reliably fixed by simple fitting together of the components concerned, so that the components can then be interconnected in a distortion-free manner by a joining process, for example by a soldering process according to WO 2005/095829.

Another aspect of the present invention relates to a seal or seal module from an exactly matching pair of lamella and carrier plate. Both the installation angle w1 and the gaps between the lamellae are specified with high accuracy, in this case by precisely cut, slightly wedge-shaped pockets in the carrier plate. The pockets in this case are constantly oriented so that each individual lamella is exactly at the angle w1, which is specified by the design, to the rotor surface. Each individual lamella has an associated pocket in the carrier plate. In this case, when fitting the lamellae into the carrier plate, a definite matching and consequently assurance of the positional accuracy ensues as a result of form-fitting insertion of the lamellae into the pockets in the carrier plate. For best possible fixing and guiding of the seal lamellae in the carrier plate, the lamellae are provided with suitable side arms which engage in the precise pockets of the carrier plate which are cut out individually for each lamella side arm. For this purpose, the side arms are provided with a defined undersize in such a way that they fit exactly into the cut pockets. For the best possible fixing and guiding of the individual lamellae, for this purpose the side arm is formed in a length which corresponds at most to the material thickness of the carrier plate. This, therefore, is to ensure a reliable fixing and guiding of the lamella on the one hand, but on the other hand to avoid it projecting beyond the carrier plate so as to avoid afterworking by milling of the projecting parts.

In this way, a multiplicity of lamellae can be fixed by simple insertion into the carrier plate for the joining operation, which follows later. With this method, both the gaps between the lamellae and the installation angle are realized with highly repeatable accuracy and dimensional stability. A sandwich-like fixing of the lamellae between two carrier plates is facilitated by the lamella being equipped on the other side only with a single side arm. Also, with low permitted tolerances, it is possible, thanks to the exact positioning of the fitted lamellae, to produce a sandwich structure which is formed from lamellar packing and carrier plates. A further decisive aspect of the geometry of the lamellae takes into consideration the joining operation which is provided at a later point in time, by which the sandwich of lamellar packing and carrier plate is interconnected in a fixed manner. This is preferably carried out by high-temperature soldering, since in this way the deformation of the module is minimized. By using special soldering foil, the soldering temperature of which is matched to the materials of the lamellae and carrier plates, the possibility results of realizing the connection as a super-solidus soldering, in which the soldering foil remains largely in the solid state and therefore no solder penetrates into the spaces, which are to be kept free, in the center region of the lamellae.

It has been proved especially advantageous if the soldering foil is selected from a high-temperature alloy which allows the super-solidus soldering in a temperature range in which residual mechanical stress is dissipated at the same time into the individual components, and these components in this case can be permanently deformed. This can be used for the exact alignment of the radial inner lamellae points and the accurate establishing of the inner radius. This deformation-free joining operation in one step reduces the production cost considerably and results in seal modules which can be installed in a turbomachine, for example a gas turbine, without any further machining.

According to an especially preferred supplement embodying principles of the present invention, a combination of different constructional forms of lamella within a lamellar seal or a lamellar seal module is proposed. The technical advantage which is associated with it is based on the fact that it is possible in this way to produce individual lamellar modules in a freely determinable arc length.

The two constructional forms of lamella differ in this case in their different number of side arms and also in their asymmetric arrangement or relative position to each other.

The regions around the individual side arms are provided with a recess into which a soldering foil is inserted before or during the fitting process in order to connect the lamellae in a materially bonding manner in their position to the carrier plates in the downstream soldering process, preferably a hard soldering process, especially a super-solidus soldering process, as already mentioned elsewhere herein.

Both in the case of manual installation and in the case of automated installation, the assembly of the lamellae to form lamellar packets and their further processing to form the finished lamellar seal is made easier, simpler, and executable with increased precision.

The modified geometry, according to principles of the present invention, of the seal lamellae allows individual modules or complete seals to be reliably fixed by simple fitting together of the individual parts and to be interconnected in a distortion-free manner by subsequent high-temperature soldering. A cost-optimized and time-optimized production results from this, and it creates the basis for the production of lamellar seals of large diameter, in which lamellae are manufactured within very close dimensional tolerances in an order of magnitude of several thousand pieces.

It allows the precise and simultaneously economical production of the individual components by readily available and proven production technologies, such as laser-cutting, stamping, or photochemical etching.

It allows the production of lamellar seals or lamellar seal modules by distortion-free, permanent connecting of the individual parts to finished size.

The outstanding advantage of the combined use of different types of construction of lamella within a seal or a seal module is the fact that modularly constructed, multi-piece sealing rings are now to be successfully constructed without significant interruption in the lamella sequence.

If two differently structured types of lamella are fitted into the carrier plate in alternating sequence, then the region between the alternating types of lamella provides sufficient connecting cross section to undertake a segmenting of the lamellar module. Just this exact parting cut basically enables the generation of lamellar modules with an arc length, which is to be freely selected, as a basic module for constructing a multi-piece lamellar sealing ring.

The segmenting, in addition to a cost-optimized production, above all enables the generating of a self-stabilizing and centering multi-piece lamellar sealing ring without troublesome interruption of the lamellar seal function and is therefore a key for the integration of lamellar seals in rotating turbomachines.

BRIEF DESCRIPTION OF THE DRAWINGS

The invention shall subsequently be explained in more detail based on exemplary embodiments in conjunction with the drawing. In the drawing:

FIGS. 3a, b, c show a type of construction of an individual lamella with asymmetrically arranged side arms;

FIG. 6 shows a side view of a partially fitted carrier plate with lamellae of different types of construction;

FIG. 7 shows the abutment situation of two lamellar modules;

DETAILED DESCRIPTION OF EXEMPLARY EMBODIMENTS

Figure 1:
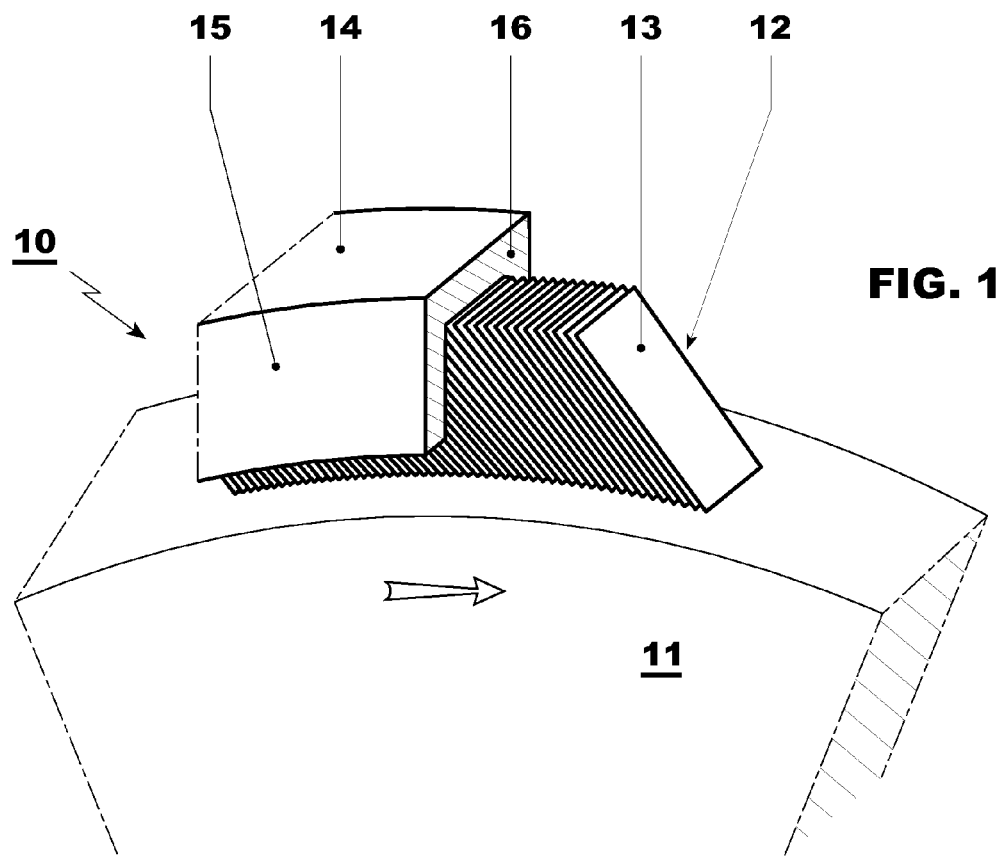
FIG. 1 shows in a perspective side view the typical construction of a lamellar seal according to the prior art, as is used in a gas turbine.
Figure 2:
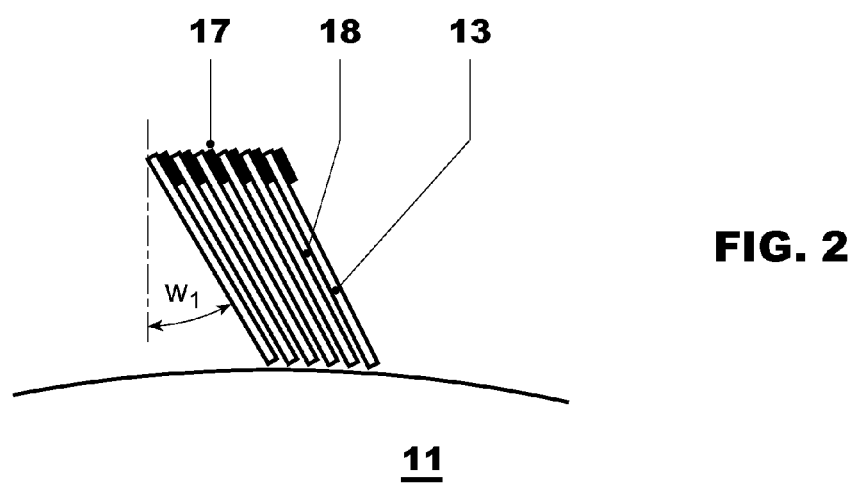
FIG. 2 shows in side view in the axial direction the arrangement of the lamellae, which is inclined in the radial direction at the angle w1, with spacer elements lying in between the lamellae, according to the prior art.

FIGS. 1 and 2 reproduce the closest prior art. In FIG. 1, in a perspective side view, the typical construction of a lamellar seal is shown, as is used for example in a gas turbine (10). The lamellar seal (12) seals a rotor shaft (11), which rotates in the direction of the arrow, of the gas turbine (10) against a casing (14). In the annular gap between the rotor shaft (11) and the casing (14), the lamellar seal (12) essentially includes a packet of thin lamellae (13) which are closely spaced apart from each other and arranged inside a carrier structure (15, 16). The lamellae (13) are oriented by their surface essentially parallel to the rotational axis of the turbine. As is apparent from FIG. 2, the lamellae (13) are inclined from the radial by an angle w1. Between the individual lamellae (13), a narrow gap or space (18) is formed in each case, which according to the prior art is established by spacer elements (17) which are arranged between the lamellae (13). In this case, the spacer elements (17) can be formed as separate elements, but they can also be integrated into the lamellae (13).

The end plates (15) and (16), which delimit the lamellae (13) upstream and downstream in a part of their radial extent, fulfill a plurality of functions. On the one hand they influence the action of the fluid flow upon the seal lamellae (13) and on the other hand they serve for fixing and guiding the lamellae.

Of particular importance for the handling and positioning of the individual lamellae (13) and their assembly to form a lamellar packet which forms a lamellar seal (12), are structures which are formed on the lamellae (13) for guiding and fixing of the lamellae (13) in the carrier structure (15, 16). According to Figures a), b), c) in drawing 3, the lamellae (13) are equipped with asymmetrically formed-on support arms (19, 20, 21) which in the fixing region (22) of the lamella (13) project laterally on the two oppositely-disposed narrow sides (23, 24) of the lamella (13). The support arms (19, 20, 21) facilitate the assembly of the lamellae (13) in the carrier structure (15, 16). The support arms (19, 20, 21), in interaction with complementarily formed pockets (25, 26) in the facing end plates (15, 16), allow a defined positioning in the radial and tangential directions and ensure the retention of the specified inclination angle w1 of the lamellae (13).

In the case of the type of embodiment which is shown in FIGS. 3a) to c), the lamella (13) has two support arms (20', 20") on the one side and a single support arm (19) on the other side. By the distance between the two arms (20') and (20") being selected as large as possible, high accuracy when establishing the inclination angle w1 results from this. In the space between the spaced-apart support arms (20') and (20"), a soldering foil (27) can preferably be inserted for the subsequent materially-bonding connection to the carrier structure (15, 16). On the opposite side, the lamella (13) is only equipped with one support arm (19). This facilitates the sandwich-like fixing of the lamella (13) between the carrier plates (15) and (16). Even with small permissible tolerances, it is possible, thanks to the exact positioning of the fitted lamellae (13), to produce a sandwich structure which is formed from lamellar packing (13) and carrier plates (15, 16).

A further important aspect of the geometry of the lamellae takes into consideration the joining operation at a later time by which the sandwich of lamellar packing (13) and carrier plates (15, 16) is interconnected in a fixed manner. The joining operation is preferably carried out by high-temperature soldering, since in this way deformation of the module is prevented. By using a soldering foil (27), the soldering temperature of which is matched to the materials of the lamellae (13) and carrier plates (15, 16), a super-solidus soldering can be realized, in which the soldering foil (27) remains largely in the solid state. A distortion-free joining operation in a single step reduces the production cost considerably and results in seal modules which can be installed in a gas turbine without any further machining.

As is furthermore apparent from FIGS. 3a) and c), the lamellae (13) have a center region (28) of reduced material thickness (shown by hatching in FIG. 3a). The reduced thickness in the center region (28) of the lamella (13) increases its radial elasticity and consequently improves application characteristics of the lamellar seal (12) which is equipped with it.

For facilitating installation, the lamella (13) is provided with a center hole (29) in order to enable the use of a guide wire as an installation aid. The hole (29) has an elliptical cross-sectional shape, the axes ratio of which is determined by the inclination angle w1.

Flat recesses on the outer edges of the lamella (13) serve for the insertion of suitably prefabricated soldering foil (27) for the subsequent materially-bonding connection to the carrier structure (15, 16).

One of the reasons for the asymmetrical forming and arrangement of the side arms (19, 20, 21) lies in the fact that such a geometry necessarily allows only an accurately fitting installation and during manual or automatic assembly can immediately detect individual, falsely-positioned lamellae (13), the installation of which is made impossible from the outset.

According to FIGS. 3a-c, the asymmetry is created by one support arm (19) being provided on one side of the lamella (13), whereas on the other side of the lamella (13) two support arms (20', 20") of the same or different shape and dimension are provided. Two oppositely-disposed support arms (19, 20, 21) can be arranged at different heights or at the same height.

FIG. 4 shows the shape of the carrier plates (15, 16) which is adapted to the geometry of the lamellae and to the arrangement of the individual lamellae (13) by simple insertion into complementary recesses (25, 26) of the carrier plates (15, 16). It is clear that an exceptionally precise manufacture both of these recesses (25, 26) as well as the lamellae (13) is a basic condition for the installation and the functional capability of the seal (12). The manufacturing tolerances of the individual components lie therefore in the region of 0.01 mm.

Figure 4A:
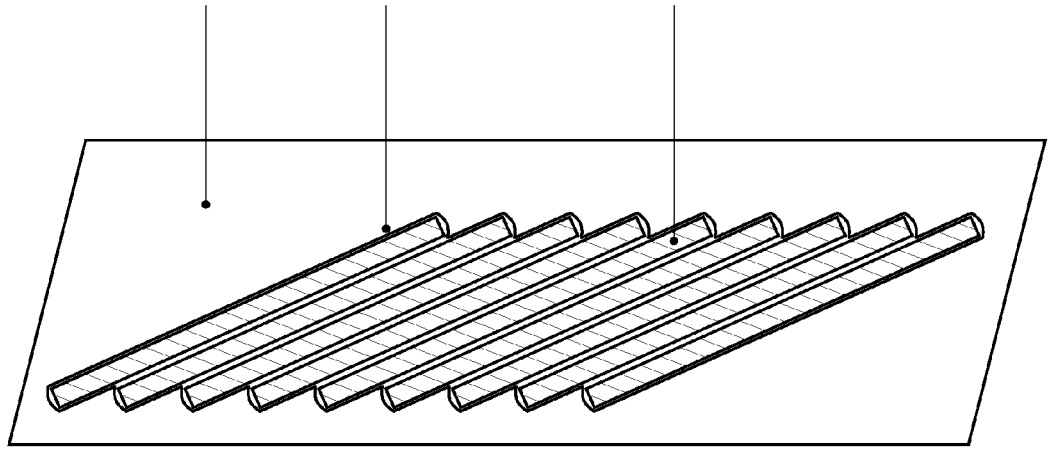
FIGS. 4a, b, c show an arrangement of the pocket-shaped recesses in the carrier plate, in which the side arms of the lamellae engage.
Figure 4B:
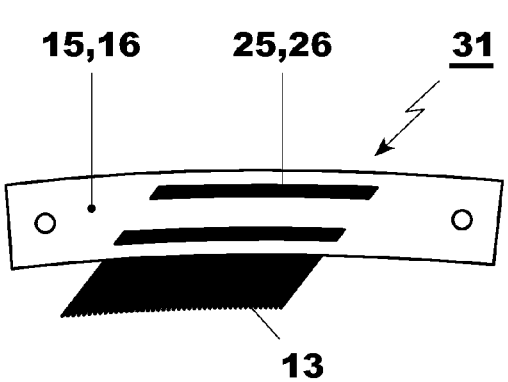
Figure 4C:
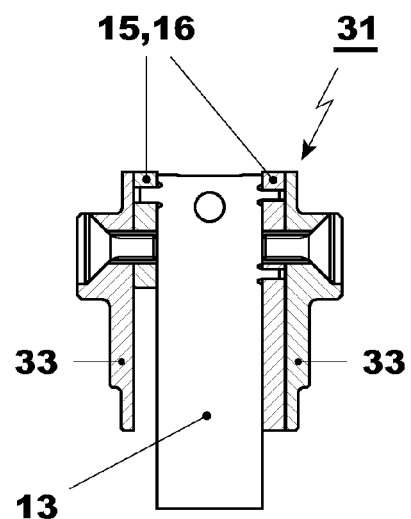

For ensuring an adequate stability, a certain minimum thickness of the carrier plates (15, 16) is necessary. This requirement is to be easily overcome by the pockets (25, 26) being produced by laser cutting with optimized process parameters and track geometries which are adapted to the cutting process. In this case, the programmed track curve for the cutting is designed so that sudden direction changes at the fixing points of the lamellae (13) during cutting are avoided. FIG. 4 shows pockets (25, 26) of the carrier plates (15, 16) with inserted lamellae (13). As is to be seen in FIG. 4a, the individual pockets (25, 26) are certainly interconnected, but tiny, tooth-like projections reliably fix the support arms (19, 20, 21) of each individual lamella (13). In the case of lamellae (13) with continuously constant thickness, or those lamellae in which the radially opposite end regions have an equal thickness, the gaps (18) extend between the individual lamellae (13) in a slightly wedge-like manner since after installation the two longitudinal ends of the lamellae (13) are located at radially different positions. The pockets (25, 26) are therefore closer together radially on the inside in an order of magnitude of, for example, a hundredth of a millimeter than radially on the outside. Alternatively, the lamellae (13) have a reducing thickness from the fixing region in the direction of the radially inner end, from which approximately constant gaps (18) result. FIG. 4b illustrates a lamellar seal segment or module (31) in its basic configuration, including oppositely-positioned carrier plates (15, 16) with lamellae (13) hooked and soldered into the pockets (25, 26). In FIG. 4c, such a seal segment (31) is reproduced in a side view. Compared with the module which is outlined in FIG. 4b, it differs in that cover plates (33) are additionally attached, for example screwed, to the carrier plates (15, 16). As is subsequently described in conjunction with FIG. 8, the cover plates (33) serve for stabilizing and especially mutual adjusting of the seal segments (31, 32) in the installed state.

Figure 5A:
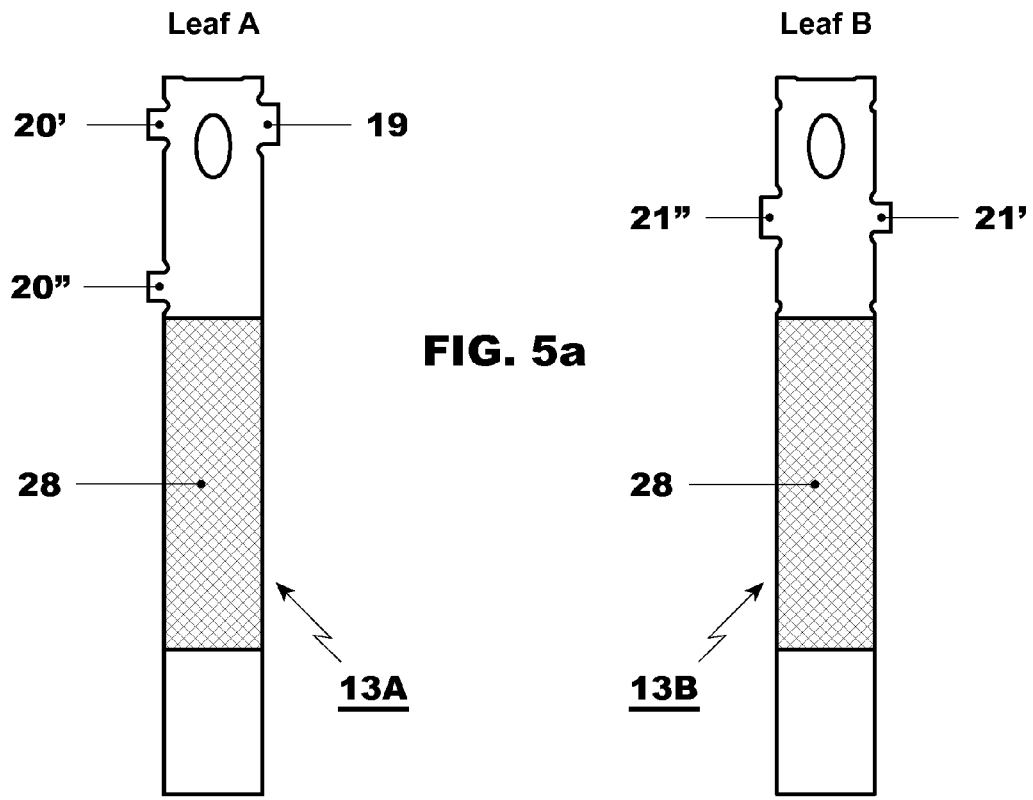
FIGS. 5a, b show a view of two different types of construction of lamella, which are combined within a module.
Figure 5B:
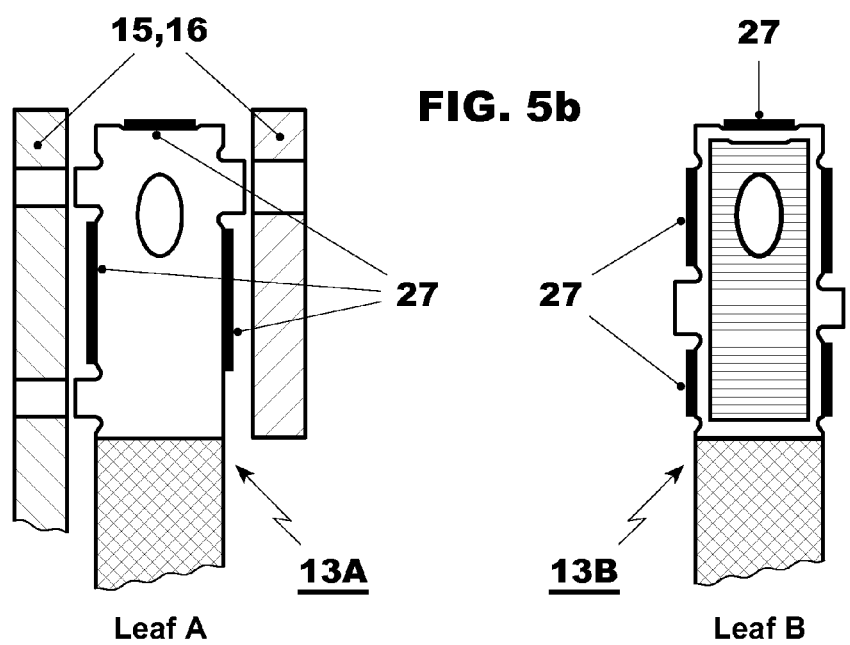

FIG. 5 represents a preferred supplementing type of embodiment of the invention, according to which two differently formed types of lamellae (13) are combined within a lamellar seal (12). The differences lie in the concrete design of the fixing region (22) of the lamellae (13). The lamella types A and B which are shown in FIG. 5 differ in the number of side arms (19, 20, 21) and also in their asymmetrical arrangement or relative position to each other. Lamellae (13) of the lamella type A which is previously described in FIG. 3 with three asymmetrically arranged side arms (19, 20', 20") are inserted inside one and the same sealing ring (12) or module of such a sealing ring (12) in a combination with lamellae (13) of type B with only two side arms (21', 21"), wherein the combined lamella types A and B differ at least in the arrangement of the side arms (19, 20, 21).

A possibility for the combination of the different lamella types A and B is clear from FIG. 6. From this figure and the explanation which refers to it, the advantages which are associated with such a measure become clearly apparent. The two differently developed lamella types A and B are introduced into the carrier structure (15, 16) in groups in an alternating arrangement. Over the length of a seal module, therefore, lamellae (13) of types A and B alternate in groups within the lamellar packet. Naturally, a corresponding design of the carrier structure (15, 16), especially of the recesses (25, 26) themselves, is required for this. Along the end plates (15, 16), one behind the other in the circumferential direction, first regions of parallel extending pockets (25A, 26A) for accommodating the first lamella type A and second regions with differently arranged pockets (25B, 26B) for accommodating the support arms of the second lamella type B are therefore created, wherein the respective pockets (25A, 25B) and (26A, 26B) which correspond to the A and the B types of construction are arranged in radially different regions of the carrier plates (15, 16).

This described procedure enables the production of individual, exactly cut-to-length lamellar basic modules which can subsequently be assembled to form a complete circle in a turbine (10) or other rotating machine. No noticeable interruption in the lamella sequence occurs at the abutment points. The exact cutting to length of a segment is carried out by a parting cut (30) through the carrier structure (15, 16) parallel to the inclination angle w1 of the lamellar arrangement, as shown in FIG. 6. Only the combination of lamellae (13) with differently arranged and formed support arms (19, 20, 21) in alternating sequence allows segmenting of the lamellar module without the mechanical integrity of the resulting segments (31, 32) being negatively affected in the process. In the case of an embodiment of a seal module with lamellae (13) of continuously uniform support structure, a cutting to length or segmenting would result in the coming apart of the end plates (15, 16) unless provision is made for a material bridge over the pockets (25, 26). However, as is readily apparent from FIG. 6, sufficient connecting cross sections always remain inside the end plates (15, 16) on account of the alternating arrangement of different lamella types A and B so that even after splitting into lengths the mechanical integrity of the segments (31, 32) is maintained.

In the exemplary type of embodiment according to FIG. 6, the different lamella types A and B are arranged in such a way that the parting cut (30) is carried out in the region of the lamella type B with only one support arm (21', 21") on both sides. In the region of the parting cut (30) the lamellae (13) are interconnected in order to introduce an additional strength and to prevent detachment of lamellae (13) at this point. This can preferably take place by soldering foil (27) being applied in the fixing region (22) on the surface which faces an adjacent lamella (13) (see FIG. 5b) in order to create an intimate and stable connection between adjacent lamellae (13) and consequently to reliably enable the subsequent exact separation along the inclination angle w1 at this point.

The assembly alone of a number of such seal segments (31, 32) to form a closed sealing ring inside the turbomachine is fraught with the problem of an initially unsatisfactory centering and stabilizing. According to an advantageous supplement of the invention, it is proposed, therefore, to provide the lamellar modules (31, 32) with cover plates (33) which are mounted in an accurately fitting manner at least onto one of the end plates (15, 16) of the segments (31, 32). In this case, the task of mutual stabilizing and centering of the assembled segments (31, 32) falls upon the cover plates (33).

Figure 8A:
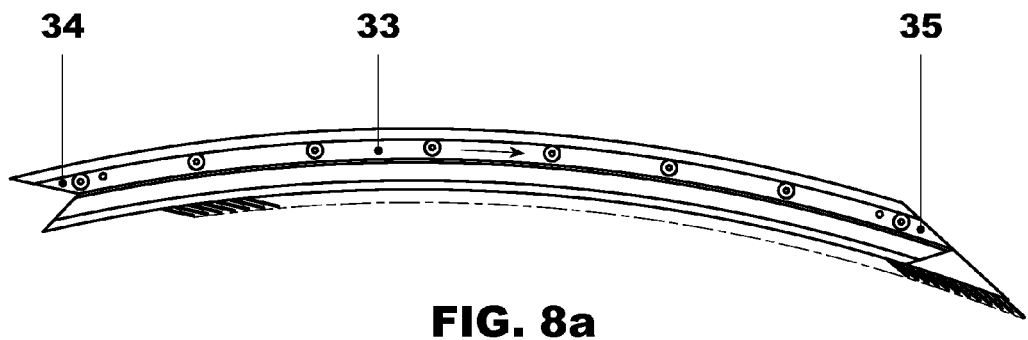
FIGS. 8a, b, c show the abutment situation of two lamellar modules in an alternative type of embodiment with a cover plate which forces a form-fit between the modules.
Figure 8B:
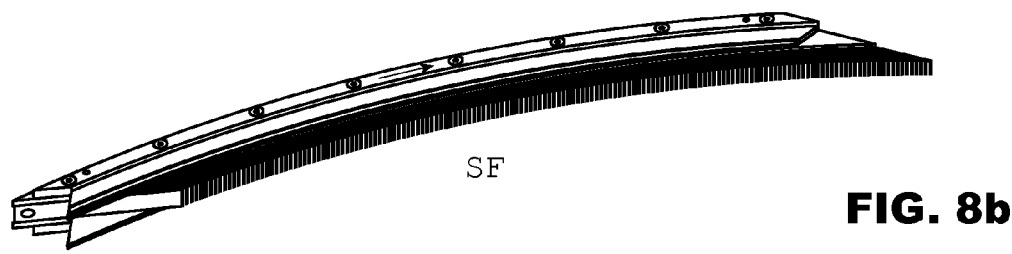
Figure 8C:
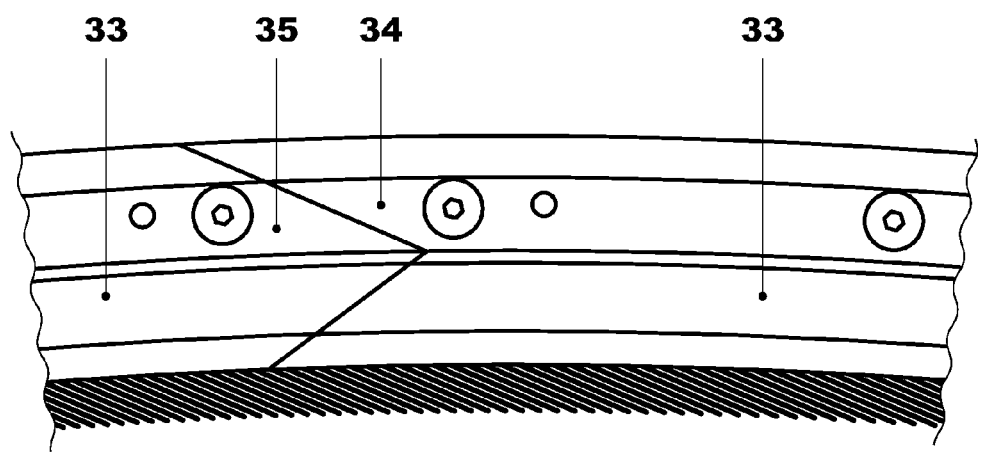
Figure 9:
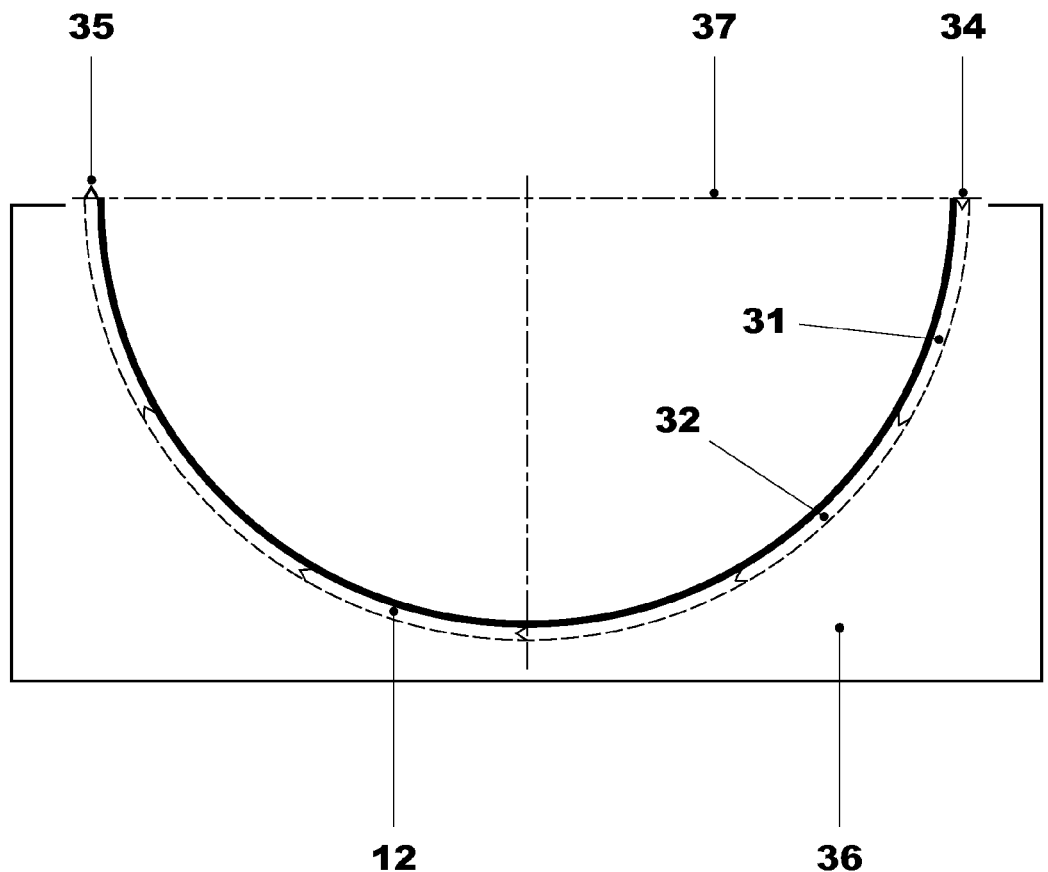
FIG. 9 shows an arrangement of lamellar seal segments in a casing half-shell.

In an especially advantageous continuation of the invention it is proposed to equip these cover plates (33) with ends (34, 35) which are formed in the shape of an arrow in such a way that as a result of a forced form-fitting of adjacent cover plates (33) a self-centering and stable connection is achieved, as follows from FIG. 8. Instead of the represented arrow-shaped design of the ends (34, 35), alternative shapes are also conceivable, which force a stable form-fit as a result of a complementary design of abutting ends (34, 35). Only shapes of the ends (34, 35) which inter-engage in a zig-zag-like, tooth-like, or wave-like manner need to be exemplarily referred to in this case. For installation on the turbomachine, division of the annular lamellar seal (12) into an even number of segments (31, 32) is advantageously advised in such a way that the parting plane of the sealing ring (12) coincides with that of the casing shells (36), these as a rule being a lower and an upper half-shell in the case of turbomachines. From FIG. 9, such an advantageous arrangement of seal segments (31, 32) in the installed state is apparent. The annular lamellar seal (12) is assembled from, for example, twelve seal segments (31, 32), six per casing half-shell (36). FIG. 9 shows only the lower half-shell (36). The seal segments (31, 32) are embedded into a casing slot. By suitable fastening devices, at least in the region of the parting plane (37), the segments (31, 32) of each half-shell (36) are fixed in their installed position. A projection of the lamellar seal (12) from the parting plane (37) is to be seen, which results from the arrow-shaped design of the end (35) of the cover plate (33).

LIST OF DESIGNATIONS

10 Turbomachine
11 Rotor
12 Lamellar seal
13 Lamella
14 Casing
15 End plate
16 End plate
17 Spacer element
18 Gap
19 Support arm
20 Support arm
21 Support arm
22 Fixing region of the lamella (13)
23 Narrow side of (13)
24 Narrow side of (13)
25 Recess/pocket in (15)
26 Recess/pocket in (16)
27 Soldering foil
28 Center region of (13)
29 Center hole
30 Separating cut
31 Segment of (12), seal module
32 Segment of (12), seal module
33 Cover plate
34 Arrow-shaped end
35 Arrow-shaped end
36 Casing shell
37 Parting plane of the turbomachine
w1 Angle While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A lamellar seal for sealing a shaft which rotates around an axis, the lamellar seal comprising:
   lamellae which are spaced one beneath the other, arranged in a circle and fixed in position, wherein the lamellae include surfaces oriented essentially parallel to each other and include a fixing region by which the lamellae can be incorporated into a carrier structure by a retainer, the fixing region comprising complementarily formed support arms projecting from each lamella;
   a carrier structure comprising at least two oppositely-disposed end plates including pockets in which the complementarily formed support arms engage in a snug-fitting manner;
   at least two modular seal segments of said carrier structure and said lamellae assembled together to form the circle; and
   a cover plate attached on at least one of the end plates of two adjacent seal segments, each cover plate having ends formed complementarily to ends of the cover plate of the adjacent seal segment to form a mutually stabilizing and centering form-fit.

2. The lamellar seal as claimed in claim 1, wherein the support arms are asymmetrically formed with regard to a line which extends in a longitudinal direction of the lamellae.

3. The lamellar seal as claimed in claim 2, wherein the support arms are located at different longitudinal positions of the lamellae.

4. The lamellar seal as claimed in claim 2, wherein each lamella has a different number of support arms on each of two sides.

5. The lamellar seal as claimed in claim 1, wherein at least one of the least two modular seal segments comprises lamellae which include at least two different configurations of lamellae, each of which configurations of lamellae at least differ in an arrangement of the support arms.

6. The lamellar seal as claimed in claim 5, wherein the different configurations of lamellae have support arms in radially different positions.

7. The lamellar seal as claimed in claim 1, wherein the different configurations of lamellae are arranged in groups and in an alternating sequence, wherein a group comprises more than one lamella of each configuration.

8. The lamellar seal as claimed in claim 1, wherein the ends of the cover plate are formed in the shape of an arrow, the ends of adjacent cover plates engaging in a form-fitting manner in complementarily arrow-shaped ends of the respective adjacent seal segment.

9. The lamellar seal as claimed in claim 1, wherein each lamella fixing region has recesses for inserting soldering foil.

10. The lamellar seal as claimed in claim 9, further comprising:
    soldering foil in said fixing region recesses.

11. The lamellar seal as claimed in claim 1, wherein:
    said circle is defined by a radius;
    a longitudinal direction is perpendicular to the radius; and
    the parallel surface of each lamella extends both longitudinally and at a non-zero angle to the radius.

12. The lamellar seal as claimed in claim 11, wherein each parallel surface is generally rectangular including first and second perpendicular dimensions, the first dimension being greater than the second dimension.

13. The lamellar seal as claimed in claim 11, wherein the support arms extend longitudinally.

14. A machine comprising:
a shaft which rotates around an axis; and
a seal according to claim 1 arranged in a concentric circle around the axis, with said surfaces essentially parallel to the axis, and sealing around the shaft.

15. A machine according to claim 14, wherein the machine is selected from the group consisting of a steam turbine and a gas turbine.

\* \* \* \* \*